July 5, 1949.  G. A. BRUESKE  2,475,126
FILM FEED AND SHUTTER INTERLOCK
FOR ROLL FILM CAMERAS
Original Filed Jan. 6, 1943  6 Sheets-Sheet 1

INVENTOR
GEORGE A. BRUESKE
BY Robert F. Miehle, Jr.
ATTY.

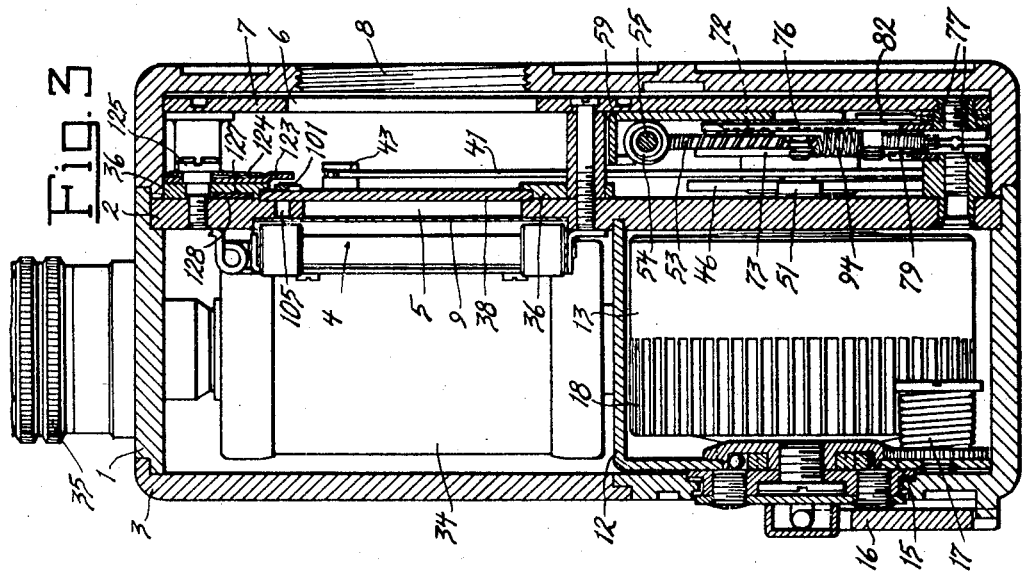
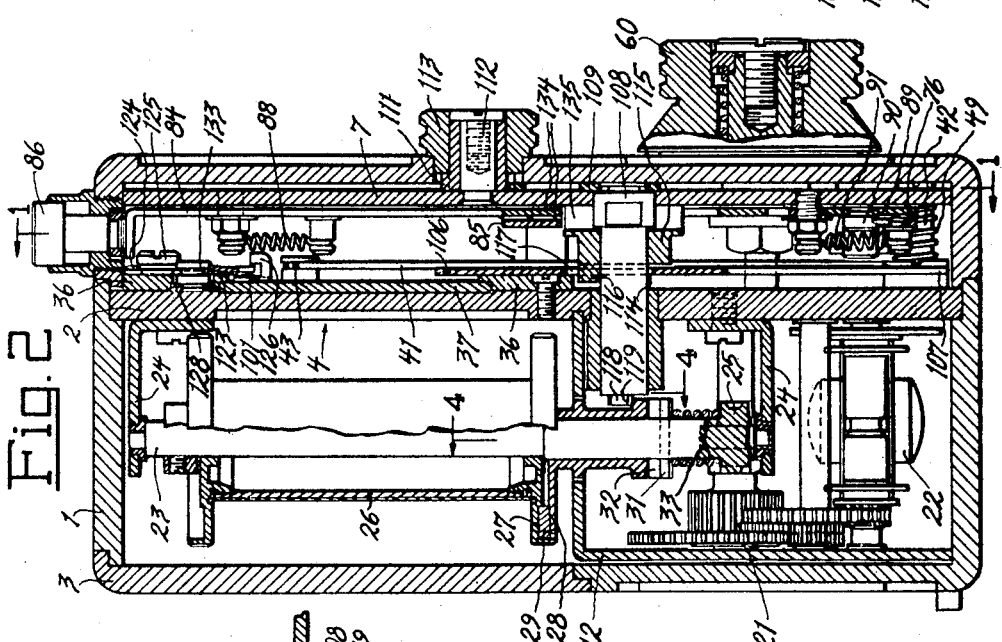
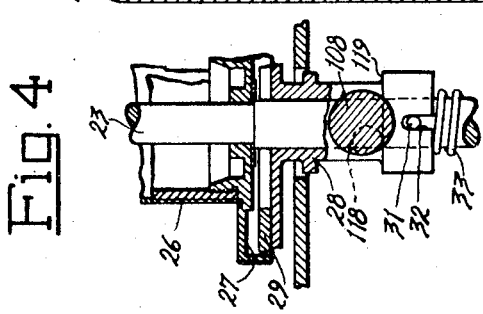

July 5, 1949.  G. A. BRUESKE  2,475,126
FILM FEED AND SHUTTER INTERLOCK
FOR ROLL FILM CAMERAS
Original Filed Jan. 6, 1943  6 Sheets-Sheet 3

INVENTOR
GEORGE A. BRUESKE
BY Robert F. Miehle, Jr.
ATTY.

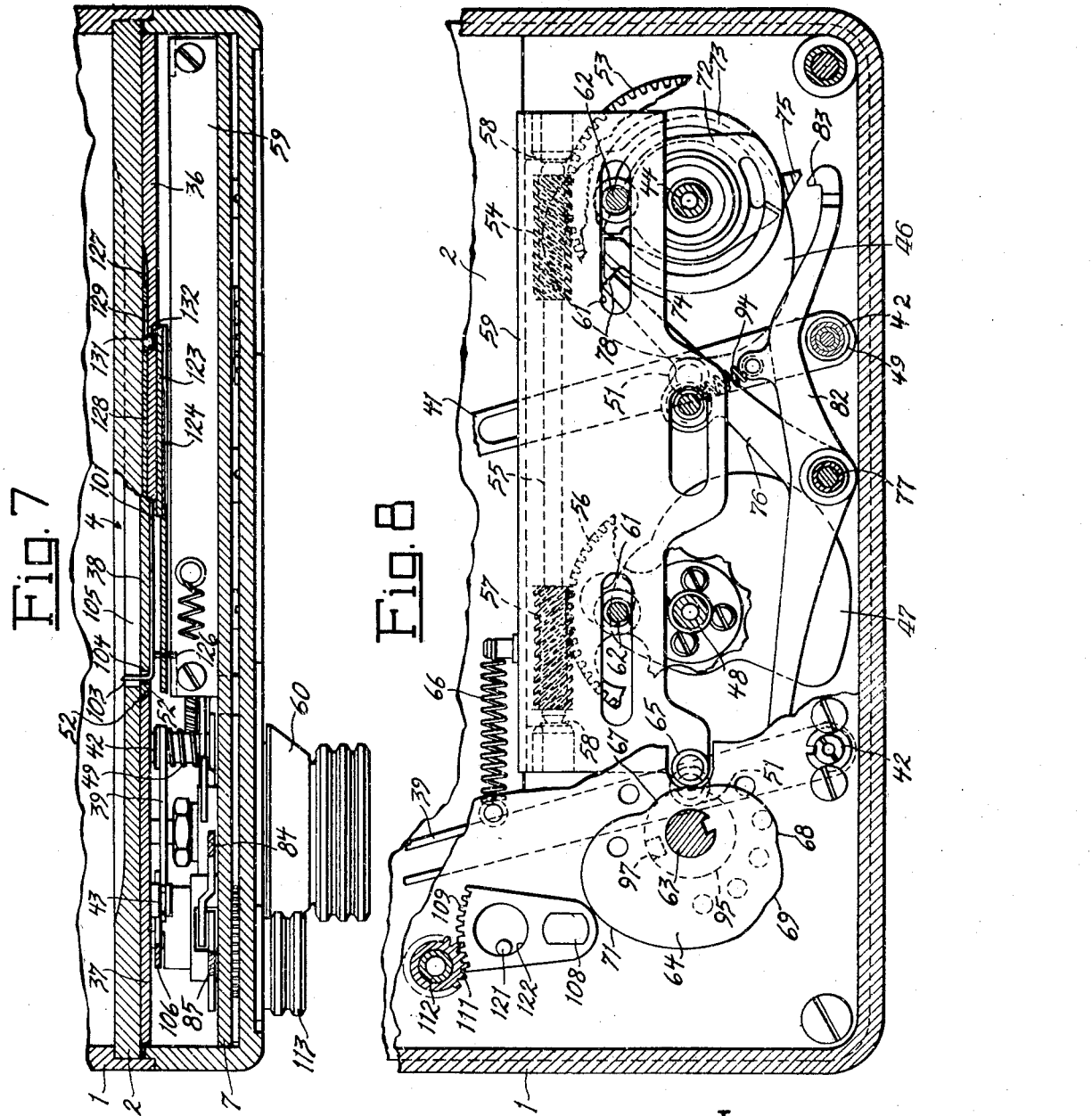

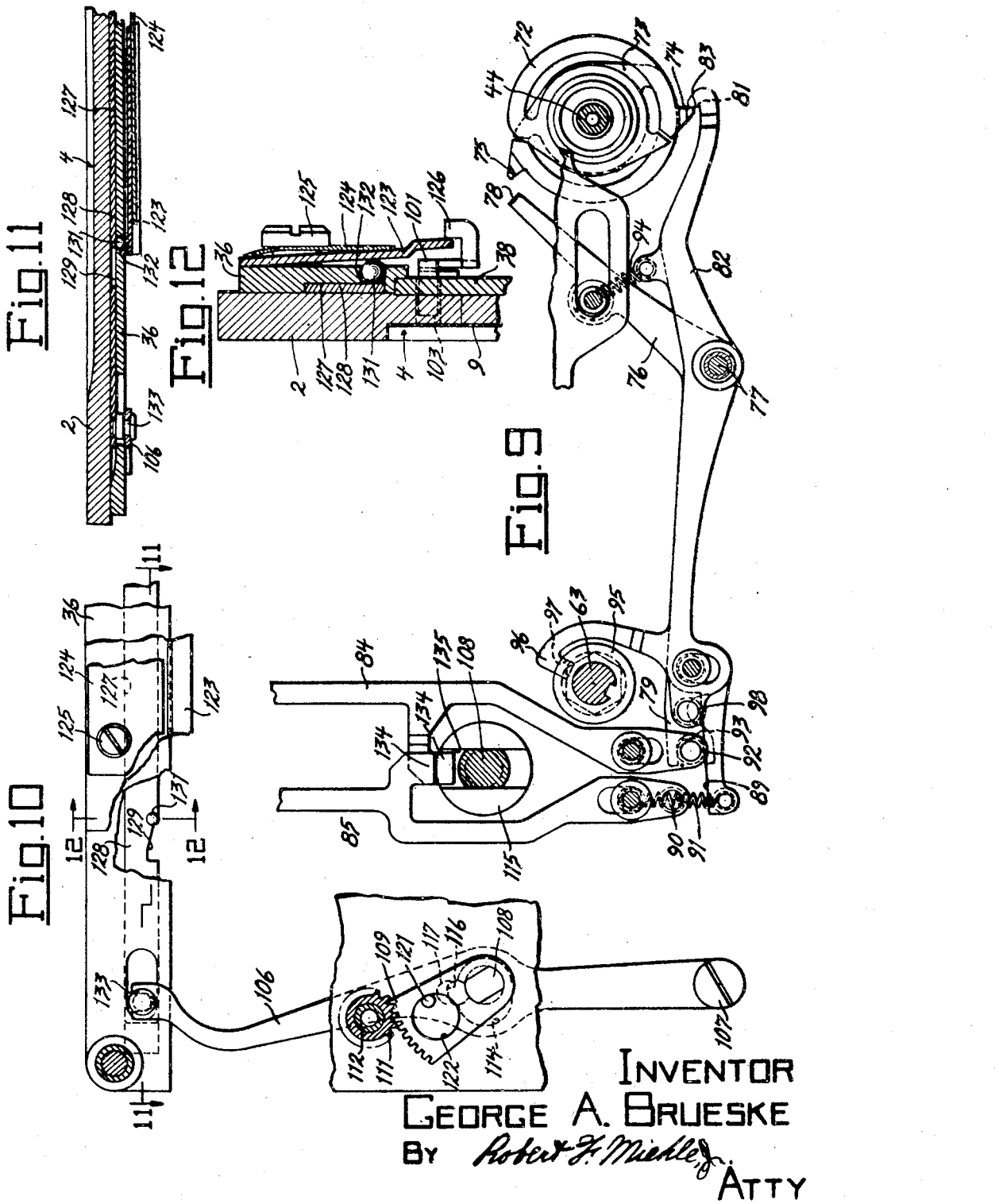

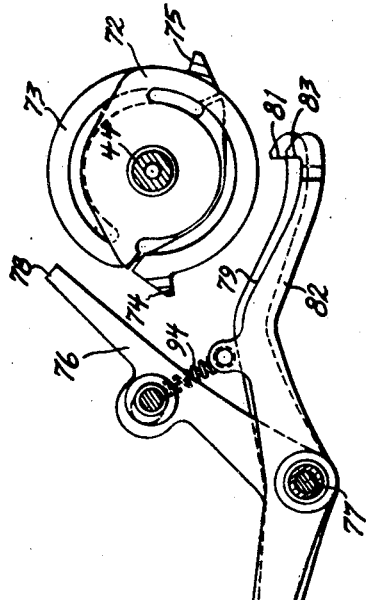
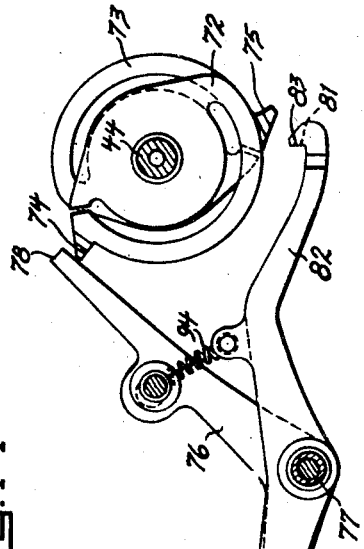
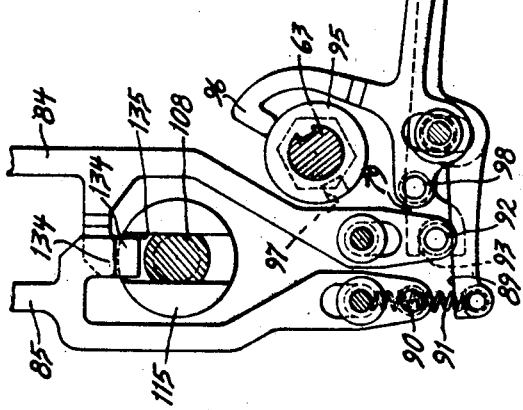

Patented July 5, 1949

2,475,126

UNITED STATES PATENT OFFICE 2,475,126

FILM FEED AND SHUTTER INTERLOCK FOR ROLL FILM CAMERAS

George A. Brueske, Wayzata, Minn., assignor to Bell & Howell Company, Chicago, Ill., a corporation of Illinois Original application January 6, 1943, Serial No. 471,411. Divided and this application March 4, 1946, Serial No. 651,732

10 Claims. (Cl. 95—31)

1

My invention relates particularly to photographic cameras of the "miniature" type, although not limited to this use alone.

The invention contemplates a photographic camera wherein a film strip is drawn as an incident of exposure of successive portions thereof, from a roll of the film strip on a rotatable spool in a light tight film cartridge removably installed in the camera, through an exposure guide by means of a film perforation engaging step feed mechanism for positioning successive frames of the film at the exposure station for exposure, and is then wound on a film take-up spool driven with the step feed mechanism, and wherein the film is rewound into the light tight film cartridge after exposure of the film strip for the removal of the film enclosed in the cartridge pursuant to development of the film, and objects of the invention reside in the provision of novel, desirable and convenient means which simultaneously disengages the film strip from the step feed mechanism and disengages the take-up spool drive whereby the film may be conveniently drawn from the take-up spool through the exposure guide and rewound within the cartridge while the camera remains closed, thus excluding light from the film during its replacement in the cartridge, which automatically locks the shutter actuation control member or members of the exposure shutter of the camera out of shutter actuating position when the film feeding means is disengaged from the film strip, and which is particularly adapted for the shutter actuation control mechanism described and claimed in and the shutter described in my co-pending application for Letters Patent of the United States, Serial No. 471,411, filed January 6, 1943, for improvement in Photographic camera, of which this application is a division and upon which Letters Patent of the United States No. 2,408,549 was granted on October 1, 1946.

With these objects in view, my invention consists in certain features of novelty in the construction, combination and arrangement of parts by which the said objects and certain other objects, hereinafter appearing, are effected, all as fully described with reference to the accompanying drawing, and more particularly pointed out in the appended claims.

In the said drawing—

Figure 2 is a sectional view substantially on the line 2—2 of Figure 1;

2

Figure 1:
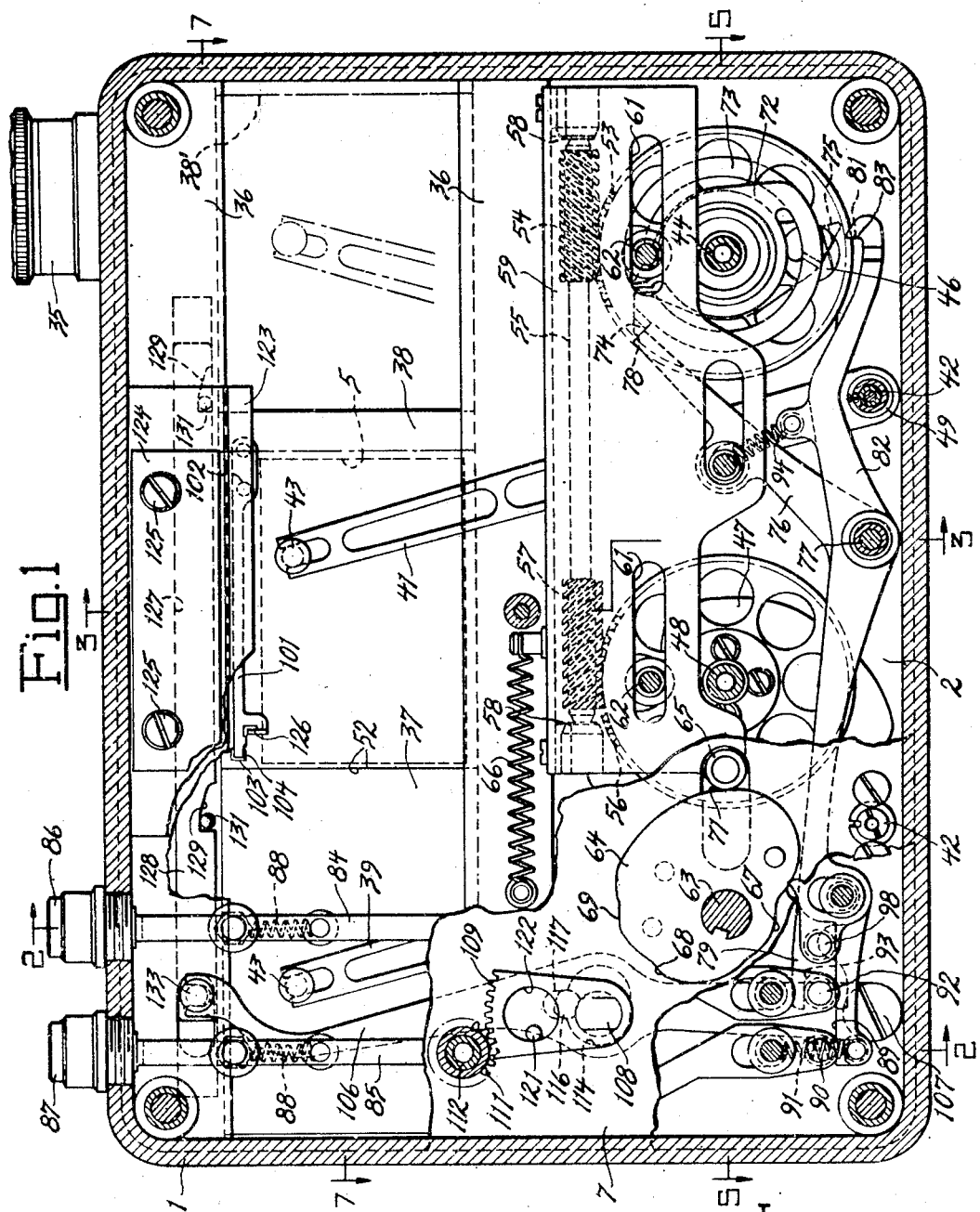
Figure 1 is a sectional view in front elevation of a photographic camera with parts broken away and embodying my invention.
Figure 5:
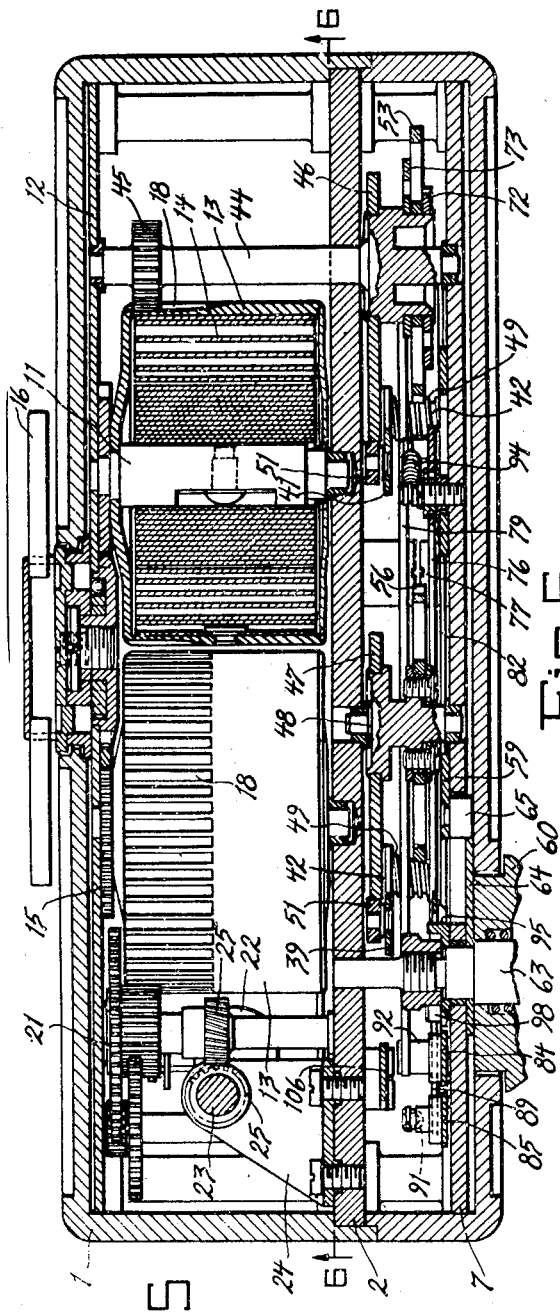
Figure 6:
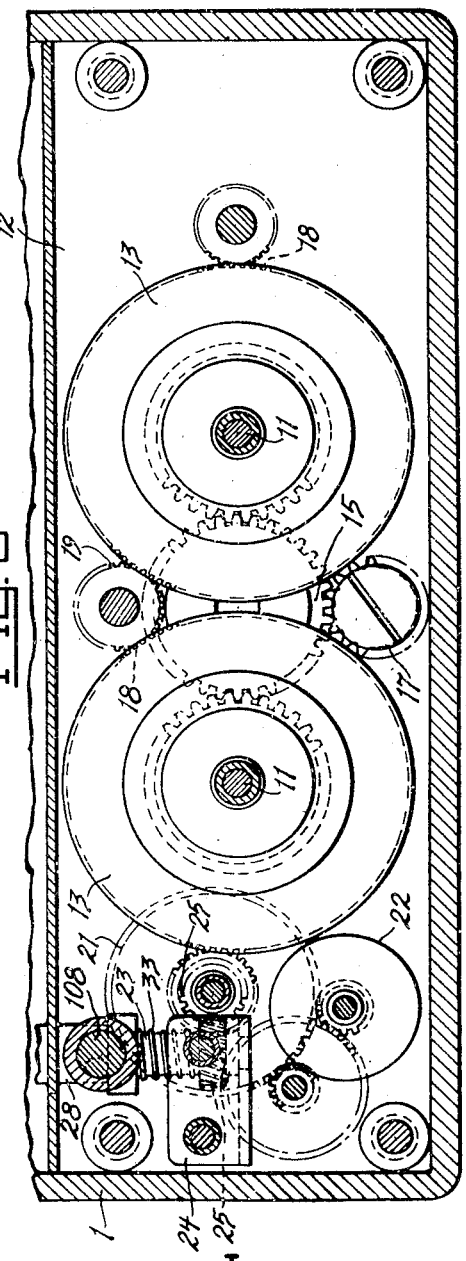

Figure 3 is a sectional view substantially on the line 3—3 of Figure 1;

Figure 4 is a partial sectional view substantially on the line 4—4 of Figure 2;

Figure 5 is a sectional view substantially on the line 5—5 of Figure 1;

Figure 6 is a partial sectional view substantially on the line 6—6 of Figure 5;

Figure 7 is a partial sectional view substantially on the line 7—7 of Figure 1;

Figure 8 is a partial sectional view similar to Figure 1 with parts broken away and showing parts in different positions from those in which they are shown in Figure 1;

Figure 9 is a partial sectional view in front elevation of the major portion of the exposure shutter control mechanism, hereinafter described;

Figure 10 is a partial sectional view of a portion of the take-up spool drive and step feed mechanism control with parts broken away, hereinafter described;

Figure 11 is a partial section substantially on the line 11—11 of Figure 10;

Figure 12 is a partial sectional view substantially on the line 12—12 of Figure 10;

Figures 13 and 14 are partial sectional views similar to Figure 9 and showing parts in different positions than those in which they are shown in Figure 9; and Figure 15 is a partial sectional view of a portion of the mechanism shown in Figures 9, 13 and 14, and showing parts in different positions than those in which they are shown in these latter figures.

Referring to the drawing, a camera casing is generally designated at 1 and is provided with an intermediate transverse vertical partition 2, and the upper rear portion of the casing is formed by a separate casing portion 3 to provide access into the upper rear or film chamber portion of the casing enclosure. See Figures 1, 2, 3, 5 and 6. An exposure guide, generally designated at 4, is arranged on the rear of the upper portion of the partition 2 and extends transversely in a vertical plane, the exposure guide including a transverse channel on the rear face of the partition and an exposure aperture 5 through the partition and aligning with a light aperture 6 through a vertical transversely disposed frame plate 7 secured in forwardly spaced relation with the partition 2 and with a photographic lens mount opening 8 through the front wall of the casing for the exposure of a frame of a film 9 in the guide at the exposure aperture. See particularly Figure 3.

Disposed in the lower rear portion of the casing are transversely spaced twin spring motors, each comprising revoluble axle 11 journaled on the partition 2 and on a frame part 12 at the rear of the partition, a hollow cylindrical casing 13 concentrically journaled on the axle, and a spiral power spring 14 within the casing and having its ends respectively connected with the casing and axle. See particularly Figure 5.

The axles 11 are connected in parallel for simultaneously winding the motors by a gear train 15 operatively connected with a winding handle 16 on the exterior of the casing, and a usual one-way check clutch 17 operative on the gear train retains the springs in wound condition. The casings 13 are connected in parallel by means of gears 18 on the casings meshing with a gear 19 rotatably mounted on the partition 2 and the frame part 12. See Figures 3 and 5.

A multiplying gear train 21 is rotatably mounted on the partition 2 and the frame part 12 at one side of the motors and has its primary gear meshing with the gear 18 of the adjacent motor for the driving of the gear train, and the final gear of this train drives a centrifugal speed governor 22 for controlling the speed of the mechanism driven by the motors. See Figures 2, 5 and 6.

A vertical shaft 23 is disposed within and at one side of the casing at the rear of the partition 2 and is journaled on vertically spaced brackets 24 secured on the partition 2. This shaft is driven by the motors by meshing right angle spiral gears 25 respectively secured with the primary gear of the gear train 21 and the lower end of the shaft. A flanged film spool 26 is rotatably mounted on the upper portion of the shaft 23 in lateral alignment with the exposure guide 4 and beyond one end thereof for taking up the film 9 from the adjacent end of the guide and feeding the film thereto.

The lower flange of the spool 26 constitutes a friction clutch member providing a downwardly facing friction clutch surface 27, and a flanged and bored clutch member 28 is slidably mounted on the shaft 23 and has an annular member 29 of friction material secured concentrically on the upper face of the flange thereof for frictional engagement with the surface 27 in an upper position of the clutch member 28 to yieldably drive the spool 26 for taking up film thereon from the exposure guide, as shown in Figure 2, the member 29 being disengaged from the surface 27 in a lower position of the clutch member 28 to permit the film being drawn from a roll thereof on the spool, as shown in Figure 4. A pin 31 is secured in a diametrical bore through the shaft 23 and slidably engages in an axially extending diametrical slot 32 at the lower end of the clutch member 28 for driving the clutch member from the shaft. A coiled compression spring 33 encircles the shaft 23 between the gear 25 of this shaft and the clutch member 28 and urges this clutch member upwardly to engage the member 29 with the surface 27 for yieldably driving the spool 26 and to permit disengagement of the film spool drive clutch, as shown in Figure 4.

A light tight film cartridge 34, see Figure 3, is suitably detachably secured in a vertical position upwardly within and at the other side of the casing at the rear of the partition 2 and in lateral alignment with the exposure guide and beyond the other end thereof for feeding the film 9 to the adjacent end of the guide from a roll of the film on a usual rotatable film spool (not shown) within the cartridge and through a usual light excluding film slot (not shown) of the cartridge.

In exposing the film, it passes from the cartridge to the exposure guide where it is intermittently fed, as hereinafter described, and, having its extending end releasably secured to the take-up spool in a usual manner not shown, is taken up thereon as the film is progressively exposed. After the exposure portion of the film has been exposed, the drive clutch of the take-up spool being disengaged and the step feed mechanism, hereinafter described, being disengaged from the film, the film is rewound into the cartridge by means of an exteriorly projecting winding knob 35 rotatably mounted on the casing in axial alignment with the cartridge spool and drivingly connected with the cartridge spool by means of a suitable clutching device (not shown) which is engageable and disengageable as incidents respectively of mounting and dismounting the cartridge.

Parallel shouldered guides 36 are secured in horizontal position on the upper portion of the front face of the partition 2 above and below the exposure aperture 5 to form a transversely extending slide guide. See Figures 1, 2 and 3. Two light shutter members 37 and 38 are slidably mounted in this slide guide for independent reciprocating movement transversely across the aperture 5 for exposing the portion of the film 9 thereat as hereinafter described.

Two transversely spaced generally vertical arms 39 and 41 are disposed forwardly of the partition 2 and have their lower portions pivoted as designated at 42. The upper ends of the arms 39 and 41 are operably connected respectively with the shutter members 37 and 38, as designated at 43, for independently reciprocating these shutter members.

A shaft 44 is journaled on the frame part 12 and the frame plate 7 and extends through the partition 2 and has a gear 45 fixed thereon which meshes with the gear 18 of one of the spring motors for the driving of this shaft therefrom. See Figure 5.

A radial cam 46, see Figures 1, 5 and 8, is secured on the shaft 44 for rotation therewith immediately in front of the partition 2, and a second radial cam 47 is also disposed immediately in front of the frame plate 2 and is fixed on a rotatable shaft 48 which has its ends respectively journaled on the partition 2 and on the frame plate 7. The arms 39 and 41 are independently actuated in one direction, with resulting corresponding movement of the shutter members 37 and 38, by torsion springs 49 associated with the pivotal mountings of and operative on the arms.

Cam rollers 51 are mounted on the arms 39 and 41 a short distance above the pivotal axes thereof which respectively engage the cams 46 and 47 for actuation of the arms 39 and 41 respectively by the cams 47 and 46 in opposition to the springs 49. See Figures 3, 5 and 8. Thus rotation of the cams 46 and 47 effects independently and respectively oscillation of the arms 41 and 39 and with them effects independently and respectively reciprocation of the shutter members 38 and 37.

The opposing vertical edges 52 of the shutter members 37 and 38 are adapted to abut, as shown in Figure 1, and are shouldered, as shown in Figure 7, for excluding the passage of light therebetween when in such abutting relation, the shutter members, when separated, forming a variable exposure opening for exposing the portion of the film at the exposure aperture 5.

The cams 46 and 47 are driven together in adjustable timed relation in the following manner. See Figures 1, 3 and 8.

A spiral gear 53, which is fixed to the shaft 44 for rotation with the cam 46, meshes with a spiral gear 54 which is fixed on an axially adjustable transverse shaft 55. Likewise, a spiral gear 56, which is fixed to the shaft 48 for rotation with the cam 47, meshes with a spiral gear 57 which is fixed on the shaft 55.

The angles of the teeth of the gears 53, 54, 56 and 57 are such that power transmission may be effected in either direction therethrough, and these gears are so proportioned that the cams 46 and 47 are rotated at the same speed, the cams being driven by the spring motors.

The shaft 55 is rotatively carried in bearings 58 at opposite ends of a transversely disposed carrier plate 59 which is mounted for transverse movement axially of the shaft 55 by means of elongated slots 61 through the plate and slidably engaged on bearing studs 62 secured on the frame plate 7, whereby the shaft 55 is axially adjustable. The angles of the spiral gears 54 and 57, as well as those of the spiral gears 53 and 56, are oppositely inclined so that axial adjustment of the plate 59 and with it the shaft 55 and the spiral gears 54 and 57 relative to the gears 53 and 56 effects corresponding adjustment of the phase relation or timing of the cams 46 and 47.

The exposure cycle of the shutter starts with the shutter members 37 and 38 at the left end, Figure 1, of their movement and in abutting or closed relation. As the cams 46 and 47 are rotated from the start of the exposure cycle, the cam 46 effects movement of the shutter member 38 to the right in advance of corresponding movement of the shutter member 37 to form the exposure opening of the shutter, after which the cam 47 effects movement of the shutter member 37 to the right normally in following fixed exposure opening forming relation with the shutter member 38 for exposing the portion or frame of the film 9 at the exposure aperture 5 of the guide 4. The shutter member 38 remains at the right end of its movement until the shutter member 37 reaches the right end of its movement in abutting or closed relation with the shutter member 38, after which the shutter members are moved to the left in abutting or closed relation to the extreme left end of their movement or to their exposure cycle starting position.

Phase relation or timing adjustment of the cams 46 and 47 by transverse adjustment of the carrier plate 59 and with it simultaneous axial adjustment of the gears 54 and 57, effects adjustment of the exposure opening formed by the shutter members 37 and 38, and the cams 46 and 47 are arranged for phase relation or timing so that the shutter member 38 may complete its rightward or exposing movement before the shutter member 37 initiates its rightward or exposing movement, see the dot-and-dash-line position 38' of the shutter member 38 in Figure 1, thus affording means for adjusting the exposure opening of the shutter increasing to a maximum opening embracing the entire exposure area covered by the shutter or the exposure aperture 5 of the guide.

The carrier plate 59 is adjustably positioned for adjusting the exposure opening of the shutter in the following manner. See Figures 1, 5 and 8.

A shaft 63 is journaled in the partition 2 and the frame plate 7 and is variably positioned by a knob 60 on the exterior of the front wall of the casing and rotatably fixed with the shaft 63. A radial cam 64 is secured on the shaft 63 and engages a cam roller 65 on the carrier plate 59 for actuating the carrier plate to the right in Figures 1 and 8, and a spring 66 is operative on the carrier plate to actuate it in the other direction, whereby the plate is adjustably positioned by angular positioning of this cam.

The cam 64 is provided with steps 67, 68, 69 and 71 of progressively increasing radii cooperating with the roller 65 to effect different predetermined exposure openings of the shutter, the step 71 of the largest radius effecting the smallest exposure opening, see Figure 1, and the step 67 of the smallest radius effecting the largest exposure opening embracing the entire exposure area covered by the shutter or the exposure aperture 5 of the guide, see Figure 8.

The above described shutter is similar to those described and claimed in U. S. Letters Patents No. 2,283,533, for improvement in Light shutter, granted May 19, 1942, on application filed by me, and No. 2,283,586, for improvement in Light shutter, granted May 19, 1942, on application filed by Bruno Stechbart.

Actuation of the shutter by the power springs is controlled in the following manner. See Figures 1, 5, 8, 9, 13, 14 and 15.

Two stop members 72 and 73 are secured on the shaft 44 for rotation therewith in axially spaced relation and are provided respectively with axially offset abutment stop formations 74 and 75 facing in the direction of rotation of this shaft, the stop formations 74 and 75 being disposed in angularly spaced approximately diametrically opposite relation.

A stop lever 76 is intermediately pivoted remote from the stop members 72 and 73 on an axis parallel to the axis thereof by means of a pivot mounting 77, and has an abutment stop formation 78 at one end thereof disposed above the axis of the stop members 72 and 73 in opposing relation with the stop formation 74 and positionable, in the pivotal movement of this lever, in and out of abutting relation with only the stop formation 74 for stopping the shutter in its closed or exposure cycle starting position as shown in Figure 1.

A second stop lever 79 is intermediately pivoted in coaxial relation with the lever 76 by means of the pivot mounting 77, and has an abutment stop formation 81 at one end thereof disposed below the axis of the stop members 72 and 73 in opposing relation with the stop formation 75 and positionable, in the pivotal movement of this lever, in and out of abutting relation with only the stop formation 75 for stopping the shutter in its closed or exposure cycle starting position slightly in advance of stoppage of the shutter by the lever 76 as shown in Figure 15.

A third stop lever 82 is intermediately pivoted in coaxial relation with the levers 76 and 79 by means of the pivot mounting 77, and has an abutment formation 83 at one end thereof disposed below the axis of the stop members 72 and 73 in opposing relation with the stop formation 74 and positionable, in the pivotal movement of this lever, in and out of abutting relation with only the stop formation 74 for stopping the shutter in an open position thereof in which the shutter members 37 and 38 are simultaneously disposed respectively at the left or exposure cycle starting position and at the right or at the end of the exposure stroke thereof and in which instant position of the shutter members 37 and 38 the shutter opening embraces the entire exposure area covered by the shutter or the exposure aperture 5, as hereinbefore referred to, for "bulb" or "time" exposure.

The stop levers 76, 79 and 82 are controlled in the following manner for effecting single exposure, continuing intermittent exposure, or "bulb" or "time" exposure in the following manner.

Two adjacent vertical control bars 84 and 85 are mounted for independent vertical movement in the camera casing and terminate at the upper ends thereof respectively with finger push buttons 86 and 87, accessible from the exterior of the casing for independent manual actuation of these control members downwardly. See particularly Figures 1 and 2. Springs 88 are respectively operative on the control members 84 and 85 to actuate the same upwardly.

The end of the stop lever 76 opposite the stop formation end thereof is provided with an upwardly facing radially extending abutment surface 89, and a spring 91 yieldably urges this lever into position wherein the abutment stop formation 78 is in abutting relation with the stop formation 74 of the stop member 72, as shown in Figures 1 and 8. See Figures 1, 9, 13 and 14.

The lower end of the bar 84 is provided with a laterally extending stud 92 which is engaged in a radial slot 93 on the end of the lever 79 opposite the stop formation end thereof, whereby downward manually actuated movement of the bar 84 effects positioning of this lever in abutting relation with the stop formation 75 of the stop member 73 and upward spring urged actuation of this bar effects positioning of this lever out of said abutting relation. The stud 92 overlies the surface 89 of the lever 76 to form a one-way connection operative between the levers 76 and 79 to position these levers respectively out of and into said abutting relation upon manual actuation of the bar 84 downwardly, the spring 88 of the bar 84 and the spring 91 normally positioning these levers respectively into and out of said abutting relation.

The lower end of the bar 85 is provided with a laterally extending stud 90 which overlies the surface 89 of the lever 76 to form a one-way connection operative between this bar and the lever 76 to position this lever out of said abutting relation upon manual actuation of the bar 85 downwardly, the spring 91 normally positioning the lever 76 in said abutting relation.

A spring 94 yieldably urges the lever 82 into abutting relation with the stop formation 74 of the stop member 72, and the periphery of a cylindrical detent member 95, fixed on the shutter opening control shaft 63 for rotation therewith, engages a detent arm 96 of the lever 82 for retaining this lever out of said abutting relation, see Figures 13 and 14, except in the position of the control shaft 63 in which the exposure opening of the shutter is at its maximum, see Figure 9, and in which position of the control shaft 63 a radial opening 97 of the detent member 95 registers with the detent arm 96 for the entry of this arm thereinto for permitting the lever 82 to be positioned in said abutting relation with the stop formation 74. A laterally extending stud 98, on the end of the lever 82 opposite the stop formation end thereof, overlies the surface 89 of the lever 76 to form a one-way connection operative between the levers 76 and 82 to position the lever 82 out of said abutting relation with positioning of the lever 76 in said abutting relation, the spring 91 of the lever 76 overpowering the spring 94 of the lever 82 for effecting this positioning of the lever 82.

The shutter control mechanism functions for single exposure, continuing exposures, or "bulb" or "time" exposure, as follows:

At the exposure cycle starting position of the shutter, both of the shutter blades 37 and 38 are at the left in abutting or closed relation as shown in Figure 1, they being held in this position by reason of the abutment formation 78 of the lever 76 engaging the abutment 74. In making a single exposure, the push button 86 is depressed, which results in the lever 76 being positioned out of abutting relation with the abutment 74, thus permitting actuation of the shutter and also results in the lever 79 being positioned in abutting relation with the abutment 75, see Figure 13, but the abutment 75 being advanced from the abutment formation 81 in the exposure cycle starting position, as shown in Figure 1, the shutter mechanism is actuated through the exposure cycle.

If the push button 86 is released before the exposure cycle is completed, the lever 76 is again positioned in abutting relation with the abutment 74 and the lever 79 is positioned out of abutting relation with the abutment 75, so that the shutter is stopped by the lever 76, as shown in Figure 1. However, if the push button 86 is not released before the exposure cycle is completed, the lever 79, being still positioned in abutting relation with the abutment 75, is engaged thereby to stop the shutter at the completion of the exposure cycle but in advance of stoppage of the shutter by the lever 76, as shown in Figure 15. Subsequent release of the push button 86 causes the lever 79 to move out of engagement with the abutment 75 and causes the lever 76 to move into abutting relation with the abutment 74 for engagement therewith for final stoppage of the shutter, as shown in Figure 1. This cooperative action of the levers 76 and 79 prevents accidental repeated exposure by reason of the push button 86 being kept in depressed position at the end of the exposure cycle.

In making continuing exposures, the push button 87 is depressed which results in the lever 76 being positioned out of abutting relation with the abutment 74, the lever 79 remaining out of abutting relation with the abutment 75, as shown in Figure 14. Accordingly, the shutter continues to repeat its exposure cycle until the push button 87 is released to permit the lever 76 to be positioned in abutting relation with the abutment 74.

During the making of single and continuing exposures, the lever 82 is retained out of abutting relation with the abutment 74 by the detent member 95 engaging the detent arm 96 of this lever. See Figures 13 and 14.

In making a bulb or time exposure, the exposure opening control shaft 63 is positioned so that the exposure opening of the shutter—through the medium of the cam 64 having the step 67 thereof engaged with the roller 65, as hereinbefore described and shown in Figure 8—is at the maximum and so that the release opening 97 of the detent member 95 registers with the detent arm 96 of the lever 82, as hereinbefore described and shown in Figure 9, to effect the positioning of the lever 82 in abutting relation with the abutment 74.

With such condition obtaining, depression of either of the push buttons 86 and 87 positions the lever 76 out of abutting relation with the abutment 74 to initiate the exposure cycle and positions the lever 82 in abutting relation with the abutment 74. Depression of either of these push buttons being continued, the abutment formation 83 of the lever 82 is engaged by the abutment 74, see Figure 9 in which the bar 84 is in its lower position as a result of depression of the push button 86, to stop the shutter in its open position in which the shutter members 37 and 38 are at opposite ends of the exposure aperture 5, as hereinbefore described, in which open position the exposure opening of the shutter embraces the entire area of the exposure aperture 5. Depression of either of the push buttons 86 and 87 is continued for the length of time desired for exposure, after which the depressed button is released, which results in the disengagement of the lever 82 from the abutment 74 and closure of the shutter, the shutter being stopped in its closed exposure cycle starting position, as hereinbefore described.

With reference to making bulb or time exposure, it will be observed that the cams 46 and 47 operate through an angle approaching 180° from their positions as effected by the stop lever 76 engaging the abutment 74, in which the shutter members 37 and 38 are in their shutter closed cycle starting position as shown in Figures 1 and 8, to their positions as effected by the stop lever 82 engaging the abutment 74 in which the shutter member 37 is still in its cycle starting position while the shutter member 38 is in its extreme open position, and that the high point of the cam 47 is considerably less than 180°. However, the shutter member 37 is retained in its cycle starting position through this movement of the cams 46 and 47 because at the start of this movement the high point of the cam 46 is operative to maintain the shutter member 38 in its cycle starting position, see Figure 8, and this shutter member through its abutting relation with the shutter member 37 retains the shutter member 37 in its cycle starting position for a considerable period of this movement before the high point of the cam 47 takes control of the shutter 37 and maintains it in its cycle starting position while the shutter 38 is moved to its extreme open position.

The film 9 is intermittently fed through the exposure guide 4 in the direction toward the take-up spool 26 to position successive frames of the film at the exposure aperture 5, in the following manner.

An elongated film feed shuttle 101 of resilient material has one end thereof secured, as designated at 102, on the front face of the shutter member 38 above the exposure aperture 5 for reciprocation longitudinally of the exposure guide 4 and extends parallel to the path of movement of the shutter members. See Figures 1, 3 and 7. The free end of the shuttle is turned rearwardly and forms a ratchet tooth 103 extending through an aperture 104 through the shutter member 38 and through an elongated transversely extending aperture 105 through the partition 2 above the exposure aperture 5 and yieldably urged by the resiliency of the shuttle into engagement with usual feed perforations, not shown, of the film 9 in the guide 4 to draw the film from the cartridge 34 and to intermittently feed the film in the guide in the direction of the take-up spool 26 with reciprocation of the shutter member 38, the film being fed by the shuttle during the stroke of the shutter members 37 and 38 in which they are maintained in closed relation or to the left in Figure 1. The take-up spool 26, being driven with the shuttle, takes up the film from the exposure guide as it is fed by the shuttle, and only as the film is intermittently fed by the shuttle because of the friction on the film in the exposure guide 4 and the drag on the film in the film cartridge 34.

A vertical arm 106 has its lower end pivotally mounted for transverse movement, as designated at 107, on the partition 2. See Figures 1, 2 and 10. A shaft 108 is journaled on the frame plate 7 and the partition 2, and gear segment 109 is rotatably secured on this shaft between the frame plate 7 and the front wall of the casing. A bored gear 111 is rotatably mounted on a stud 112 on and projecting forwardly from the frame plate 7 and meshes with the gear segment 109 for actuating the shaft 108 with angular movement of the gear 111. A knob 113 is secured on the gear 111 and projects exteriorly of the casing for manipulation of the gear 111 and with it the shaft 108.

The arm 106 is provided with a relatively large intermediate opening 114 therethrough through which the shaft 108 extends, and a bored member 115 is rotatably secured on the shaft 108 and is provided with a crank pin 116 slidably and rotatably engaging a radial slot 117 of the arm 106 for actuation of this arm with angular movement of the shaft 108. The rear end of the shaft 108 is provided with a crank pin 118 disposed above an upwardly facing shoulder 119 on the clutch member 28 for engagement therewith to actuate the same downwardly and disengage the take-up spool drive clutch when the shaft 108 is actuated to one end of its movement as shown in Figures 4 and 10, movement of this shaft being limited by a pin 121 on the partition 2 and projecting into a relatively large aperture 122 of the gear segment 109. Positioning of the shaft 108 at the opposite end of its movement, as shown in Figures 1 and 2, permits the spring 33 to engage the take-up spool drive clutch.

As will be observed, the front face of the upper guide 36 is disposed in a plane parallel to that of the exposure guide 4. See Figures 1, 2, 3, 7, 10, 11 and 12. An elongated plate 123 overlies the front face of the upper guide and extends longitudinally of the exposure guide, and an elongated spring plate 124 overlies the front face of the plate 123 and also extends longitudinally of the exposure guide. Headed and shouldered screw studs 125, spaced longitudinally of the exposure guide, extend through apertures through the spring plate 124, the plate 123 and the upper guide 36, and are screwthreaded into the partition 2 to secure the assembly. The arrangement is such that the spring plate 124 yieldably urges the plate 123 rearwardly against the front surface of the upper guide 36, as shown in Figures 2 and 3, but permits the plate 123 to be tilted so that the lower edge portion thereof is moved forwardly as shown in Figure 12.

The shuttle is provided, adjacent its toothed end, with an arm terminating in an upwardly extending end 126 disposed in front of the lower edge portion of the plate 123 so that this plate is engageable with the shuttle throughout the reciprocation of the shuttle longitudinally of the exposure guide in opposition to film engaging movement of the shuttle. Thus, when the lower edge portion of the plate 123 is moved forwardly by tilting this plate in opposition to the spring plate 124, the shuttle is disengaged from the film as shown in Figure 12, the spring moving the plate 123 rearwardly when this plate is released to engage the shuttle with the film.

The rear face of the upper guide 36 is provided with a channel 127 at the rear of the lower portion of the plate 123 and extending parallel to the feed path of the shuttle and forming a slide guide with the front face of the patrition 2, and an elongated bar 128 extends longitudinally of the exposure guide and is slidably mounted in this slide guide for reciprocation longitudinally of the exposure guide. This bar is provided with corresponding cam openings 129 spaced and extending longitudinally thereof. Balls 131 are engaged respectively in apertures 132, see Figure 12, through the upper guide 36 and spaced longitudinally of the exposure guide, for movement normal to the plate 123 and are respectively engageable with the cam openings 129 and oppositely with the rear face of the plate 123 and in opposition to the spring plate 124. With positioning of the bar 128 at one end of its movement, see Figures 1 and 7, the balls 131 are positioned rearwardly and extending within the cam openings 129 and permit the spring plate 124 to position the plate 123 rearwardly, thus permitting the shuttle to engage the film in the guide 4. With positioning of the bar 128 at the other end of its movement, see Figures 10, 11 and 12, the balls are positioned by the cam openings 129 out of the same and forwardly and position the plate 123 forwardly in opposition to the spring plate 124, thus disengaging the shuttle from the film in the guide.

The upper end of the arm 106 is operatively connected with the bar 128, as designated at 133, for actuating the bar with pivotal movement of the arm, it being observed that this arm is actuated from the shaft 108, as hereinbefore described, which controls engagement and disengagement of the take-up spool drive clutch, and the arrangement is such as to provide means for simultaneously disengaging this clutch and the film from the shuttle and engaging the same with obvious convenience in rewinding the exposed film into the cartridge 34.

The bars 84 and 85 are provided with downwardly projecting detent formations 134 disposed above the axis of the shaft 108, and the member 115 is provided with a diametrical slot 135 which aligns with the detent formations 134, when the shaft 108 is positioned with the take-up spool drive clutch engaged and with the shuttle engaged with the film, to permit, by receiving these detent formations, either of the bars 84 and 85 to be depressed for exposure of the film in the guide. See Figures 9, 13 and 14. However, when the shaft 108 is positioned with the take-up spool drive clutch disengaged and with the shuttle disengaged from the film, the member 115 serves as a detent oposing the detent formations 134 and prevents depression of either of the bars 84 and 85 for exposure, thus preventing re-exposure of the film during the rewinding thereof into the cartridge 34.

While I have thus described my invention, I do not wish to be limited to the precise details described, as changes may be readily made without departing from the spirit of my invention, but having thus described my invention, I claim as new and desire to secure by Letters Patent the following:

1. In a photographic camera, the combination with an exposure guide, of an exposure shutter operatively related with said guide and including a shutter member reciprocable longitudinally of the guide, a ratchet toothed feed member carried by said shutter member for reciprocation therewith and yieldably urged into engagement with feed perforations of a film in said guide, a revoluble film spool, a yieldable friction clutch for rotating said spool with operation of said shutter comprising clutch members yieldably urged into engagement, a control member extending longitudinally of said guide and mounted for movement corresponding with the film engaging and disengaging movement of said feed member and engageable with said feed member throughout said reciprocation of said feed member in opposition to film engaging movement thereof and yieldably urged in the direction of film engaging movement of said feed member, an angularly movable eccentric member for disengaging said clutch, a cam member mounted for movement parallel to the feed movement of said feed member for actuating said control member in opposition to the yieldable urge thereof, and an operative connection between said eccentric member and said cam member for simultaneously disengaging said clutch members and said feed member from the film and engaging the same.

2. In a photographic camera, the combination with a film guide, of means for feeding a film through said guide including a ratchet toothed feed member reciprocable longitudinally of said guide and yieldably urged into engagement with feed perforations of the film in said guide, a control member extending longitudinally of said guide and mounted for movement corresponding with the film engaging and disengaging movement of said feed member and engageable with said feed member throughout said reciprocation of said feed member in opposition to film engaging movement thereof for positioning said feed member out of engagement with the film, spring means yieldably urging said control member in one direction, and a cam member mounted for movement parallel to the movement of said feed member for actuating said control member in opposition to said spring means.

3. In a photographic camera, the combination with a film guide, of means for feeding a film through said guide including a ratchet toothed feed member reciprocable longitudinally of said guide and yieldably urged into engagement with feed perforations of the film in said guide, a frame structure having a surface disposed in a plane corresponding with the plane of the guide, a control plate extending longitudinally of said guide and overlying said surface, a spring plate extending longitudinally of said guide and overlying said control plate in opposite relation with said surface, headed studs spaced longitudinally of said guide and extending through openings through said spring and control plates and mounted on said frame structure, said studs permitting facewise tilting movement of said control plate, said spring plate yieldably urging said control plate against said surface, said control plate being engageable with said feed member throughout said reciprocation of said feed member in opposition to film engaging movement thereof for positioning said feed member out of engagement with the film, and means for tilting said control plate in opposition to said spring plate.

4. In a photographic camera, the combination with a film guide, of means for feeding a film through said guide including a ratchet toothed feed member reciprocable longitudinally of said guide and yieldably urged into engagement with feed perforations of the film in said guide, a frame structure having a surface disposed in a plane corresponding with the plane of the guide, a control plate extending longitudinally of said guide and overlying said surface, means carrying said control plate on said frame structure for facewise tilting movement, spring means yieldably urging said control plate against said surface, said control plate being engageable with said feed member throughout said reciprocation of said feed member in opposition to film engaging movement thereof for positioning said feed member out of engagement with the film, an elongated cam member extending longitudinally of said guide and slidably mounted on said frame structure for movement longitudinally of said guide and provided with corresponding cam portions spaced and extending longitudinally thereof, and cam actuated members mounted on said frame structure in spaced relation longitudinally of said guide for movement normal to said control plate and respectively engaged with said cam portions and oppositely with a face of said control plate and in opposition to said spring means for tilting said control plate with longitudinal movement of said cam member.

5. In a photographic camera, the combination with an exposure guide, of an exposure shutter associated therewith, a shutter actuation control member operatively connected with said shutter, means for feeding a film through said guide, means for disengaging said feeding means from the film, and means under the control of said disengaging means for locking said control member out of shutter actuation position when said feeding means is disengaged from the film.

6. In a photographic camera, the combination with an exposure guide, of an exposure shutter associated therewith, a reciprocatory shutter actuation control member operatively connected with said shutter and yieldably urged out of shutter actuation position, means for feeding a film through said guide including a toothed feed member engaging feed perforations of the film, means for disengaging said feed means from the film including an angularly movable member, and a locking element fixed with said angularly movable member and engageable by said control member for locking the same out of shutter actuation position when said feeding means is disengaged from the film.

7. In a photographic camera, the combination with an exposure guide, of an exposure shutter associated therewith, a shutter actuation control member operatively connected with said shutter, means for feeding a film through said guide including a toothed feed member engaging feed perforations of the film, a revoluble film spool, disengageable means for driving said spool with operation of said feeding means for taking up a film fed by said feeding means, means for simultaneously disengaging said drive means and the film from said feed member and engaging the same, and means under the control of said disengaging means for locking said control member out of shutter actuation position upon disengagement of said drive means and the film from said feed member.

8. In a photographic camera, the combination with an exposure guide, of an exposure shutter associated therewith, a reciprocatory shutter actuation control member operatively connected with said shutter and yieldably urged out of and manually actuable into shutter actuation position, means for feeding a film through said guide including a toothed feed member engaging feed perforations of the film, a revoluble film spool, a yieldable friction clutch for rotating said spool with operation of said feeding means for taking up film fed by said feeding means and comprising clutch members yieldably urged into engagement, manually controlled means for simultaneously disengaging said clutch and said film from said feed member and engaging the same, and a locking element under the control of said disengaging and engaging means and operative on said control member for locking the same out of shutter actuation position upon disengagement of said clutch and the film from said feed member.

9. In a photographic camera, the combination with an exposure guide, of an exposure shutter associated therewith, two shutter actuation control members independently operatively connected with said shutter, means for feeding a film through said guide, means for disengaging said feeding means from the film, and means under the control of said disengaging means for locking both of said control members out of shutter actuation position when said feeding means is disengaged from the film.

10. In a photographic camera, the combination with an exposure guide, of an exposure shutter associated therewith, two reciprocatory shutter actuation control members independently operatively connected with said shutter and yieldably urged out of and manually actuable into shutter actuation position, means for feeding a film through said guide including a toothed feed member engaging feed perforations of the film, a revoluble film spool, disengageable means for driving said spool with operation of said feeding means for taking up a film fed by said feeding means, manually controlled means for simultaneously disengaging said drive means and the film from said feed member and engaging the same, and a locking element under the control of said disengaging and engaging means for locking both of said control members out of shutter actuation position upon disengagement of said drive means and the film from said feed member.

GEORGE A. BRUESKE.

REFERENCES CITED

The following references are of record in the file of this patent:

UNITED STATES PATENTS

| Number | Name | Date |
| --- | --- | --- |
| 2,111,425 | Goldhammer | Mar. 15, 1938 |
| 2,140,445 | Mihalyi | Dec. 13, 1938 |
| 2,150,642 | Wachtler | Mar. 14, 1939 |
| 2,150,693 | Mihalyi | Mar. 14, 1939 |
| 2,226,161 | Drotning | Dec. 24, 1940 |
| 2,266,656 | Nuchterlein | Dec. 16, 1941 |
| 2,275,791 | Mihalyi | Mar. 10, 1942 |
| 2,280,737 | Alburger | Apr. 21, 1942 |